US012272227B1

(12) United States Patent
Martinez et al.

(10) Patent No.: US 12,272,227 B1
(45) Date of Patent: Apr. 8, 2025

(54) SYSTEM AND METHOD FOR AUTOMATICALLY GENERATING POST-INCIDENT WORKFLOW USING DIRECTIONAL CHIRPING

(71) Applicant: MOTOROLA SOLUTIONS, INC., Chicago, IL (US)

(72) Inventors: Jorge A Martinez, Chicago, IL (US); Gregory Tsoris, Mundelein, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 6 days.

(21) Appl. No.: 18/532,269

(22) Filed: Dec. 7, 2023

(51) Int. Cl.
*G08B 23/00* (2006.01)
*G08B 3/10* (2006.01)
*G08B 21/22* (2006.01)

(52) U.S. Cl.
CPC ............... *G08B 21/22* (2013.01); *G08B 3/10* (2013.01)

(58) Field of Classification Search
CPC ................................. G08B 21/22; G08B 3/10
USPC ....................................................... 340/573.1
See application file for complete search history.

(56) References Cited

U.S. PATENT DOCUMENTS

| | | | | |
|---|---|---|---|---|
| 8,941,465 | B2 | 1/2015 | Pineau et al. | |
| 9,024,748 | B2 | 5/2015 | Haase et al. | |
| 9,031,605 | B2 | 5/2015 | Czaja et al. | |
| 9,159,210 | B2 | 10/2015 | Jones, Jr. et al. | |
| 9,354,629 | B2 | 5/2016 | Balentine et al. | |
| 10,896,321 | B2 | 1/2021 | Dalley, Jr. et al. | |
| 10,964,177 | B1 | 3/2021 | Coles | |
| 11,798,331 | B2 | 10/2023 | Tan et al. | |
| 2011/0136463 | A1* | 6/2011 | Ebdon | G01C 21/206 455/404.1 |
| 2012/0229274 | A1 | 9/2012 | Rabey | |
| 2016/0055692 | A1* | 2/2016 | Trani | G07C 9/00571 340/5.61 |
| 2022/0353661 | A1* | 11/2022 | Shen | H04W 4/90 |

* cited by examiner

*Primary Examiner* — Tai T Nguyen
(74) *Attorney, Agent, or Firm* — Barbara R Doutre

(57) ABSTRACT

A communication system, method and device are provided for managing a post-incident response. The system includes a security system controller having a processor configured to receive a notification that a mass incident event, such as an active shooter event, has ended and send a prompt requesting in-room victim status information to a plurality of in-room communication device of the building. Analytics are performed by the processor on the received in-room victim status information to determine room priority. A post-incident workflow is triggered that generates a plurality of control signals indicative of each room priority and in-room victim status for each room. The plurality of control signals are sent to chirp generators of door access control devices associated with each room of the building. Each control signal controls chirp playout indicative of the room priority and victim status. A mutual aid responder, without access to a radio, can follow the audible chirps.

20 Claims, 3 Drawing Sheets

SYSTEM AND METHOD FOR AUTOMATICALLY GENERATING POST-INCIDENT WORKFLOW USING DIRECTIONAL CHIRPING

BACKGROUND

After a mass incident event has stopped, there is significant time critical pressure to locate injured people and to assess, treat and/or move injured people from the incident scene. Mass incidents events, such active shooter events or major environmental events (for example earthquake, tornado or the like) may impact many people in a building. While public safety personnel, such as police and emergency medical technicians, may be able to address post-incident response using radio communications, there are other individuals, referred to as mutual aid responders, who may be on-scene prior to arrival of any public safety personnel. For example, public safety personnel responding to an incident may encounter road blockages, weather delays, and/or other impediments prior to arriving on the scene, and thus the ability of mutual aid responders may be further relied upon for post-incident response. These mutual aid responders may include staff, janitors, and others who do not have access to radio communication. Hence, mutual aid responders who do not carry a radio are currently limited in their capacity to help at the post-incident scene.

Accordingly, there is a need to improve the ability of a mutual aid responder who does not carry a radio, in post-incident response.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
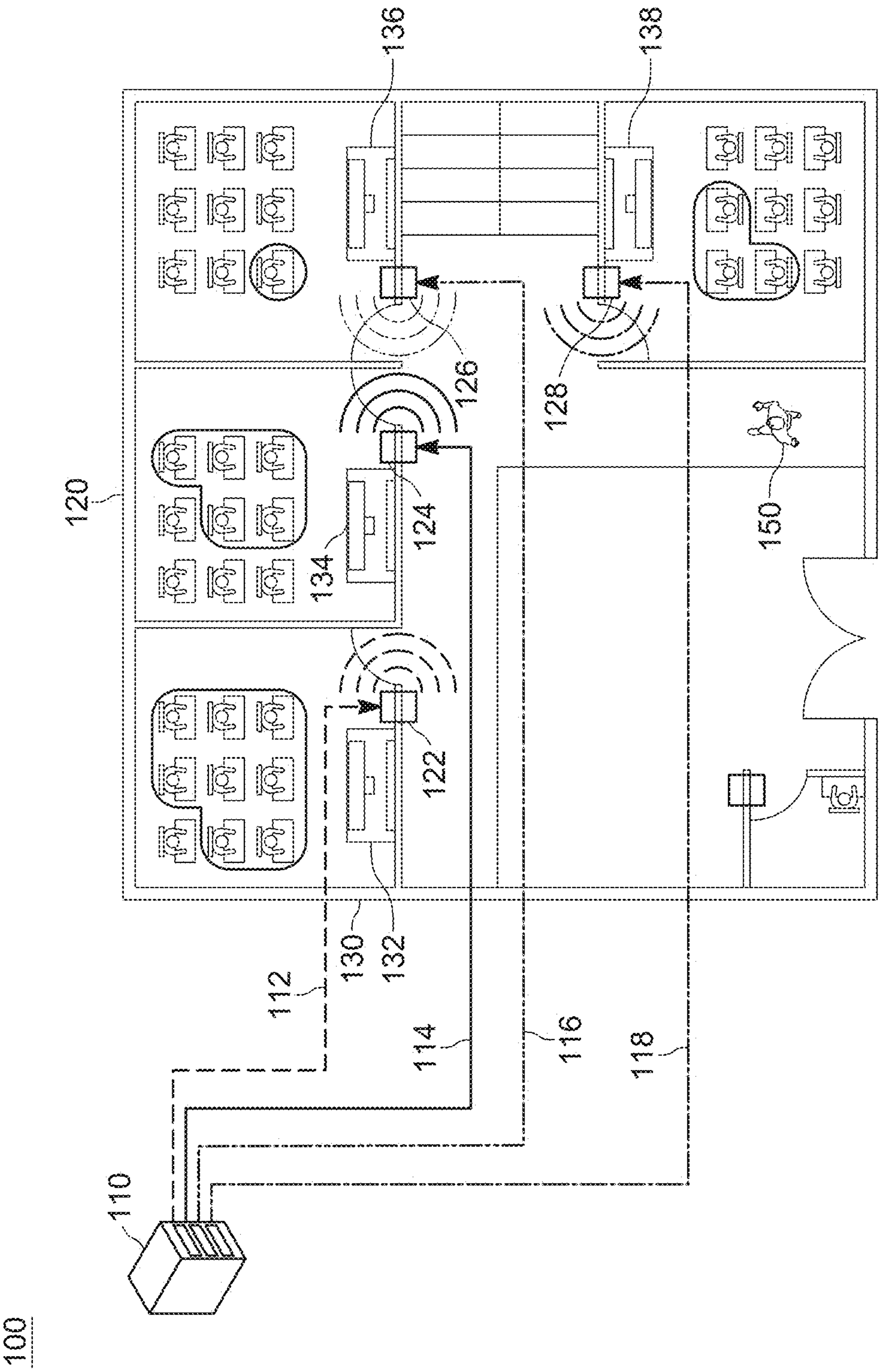
FIG. 1 is an example of an environment in which a post-incident workflow including directional chirping for a mutual aid responder is triggered in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, there is provided a communication system, method and device(s) for automatically generating a post-incident workflow using directional chirping within a building. The workflow facilitates the ability of a mutual aid responder, not having a radio, to locate individuals within the building. While the embodiments have been described in terms of a mass shooter event, it is to be appreciated that the post-incident workflow may be applied to other mass incident events, such as environmental events, for example earthquake, tornado, or other events that impact individuals in a building, such as a school or an office building, to name a few.

A method is provided. The method manages a post-incident response in a building, by receiving, at a security system processor, a notification that an active shooter event (or other mass incident event) has ended and sending a prompt, from the security system processor, requesting in-room victim status information to a plurality of in-room communication device of the building. The method includes receiving, at the security system processor, the in-room victim status information and performing, by the security system processor, analytics on the in-room victim status information to determine room priority. The method further includes triggering, by the security system processor, a workflow that generates a plurality of control signals indicative of each room priority and in-room victim status for each room; and sending, from the security system processor, the control signals to chirp generators of door access control devices associated with each room of the building, each control signal controlling chirp playout indicative of the room priority and victim status.

A non-transitory processor readable medium containing a set of instructions thereon that when executed by a processor cause the processor to detect a post-incident notification within a building that an active shooter event (or other mass incident event) has ended; send a prompt to retrieve in-room victim status information from in-room devices in the building; perform analytics on the in-room victim status information to determine room priority; trigger a workflow that generates a plurality of control signals indicative of each room priority and in-room victim status for each room; and send the control signals to chirp generators of door access control devices associated with each room of the building, each control signal controlling chirp playout indicative of the room priority and victim status.

A door access control device is provided which includes a reader device responsive to predetermined inputs for door access to a room and a chirp generator configured to generate an audible chirp in response to valid door access, wherein the chirp generator is further reconfigurable to generate customized audible chirp signals indicative of in-room victim status in response to a post-incident control signal.

Each of the above-mentioned embodiments will be discussed in more detail below, starting with an overall environment in which a post-incident workflow including directional chirping for a mutual aid responder is triggered. This is followed by an illustration of an improved technical method for managing a post-incident response by generating a post-incident workflow including dynamically controlled chirping. The description concludes with an architecture of element(s) that may implement the techniques described herein.

Further advantages and features consistent with this disclosure will be set forth in the following detailed description, with reference to the figures.

FIG. 1 is an example of a building 100 in which a post-incident workflow including directional chirping for a mutual aid responder is triggered in accordance with some embodiments. The building 100 includes a controller 110 for managing security of the building. The building 100 may be any type of building having multiple rooms, which may be occupied by individuals. For example, the building 100 may be a school building or office building having classrooms and/or offices occupied by students and/or employees.

The building 100, as part of its security management, includes a plurality of door access control devices 120, depicted as door access control devices, 122, 124, 126, 128. The plurality of door access control devices 120 may include a reader device responsive to predetermined inputs for door access to a room. For example, the reader device may be an RFID reader responsive to a RFID badge, a scanner responsive to fingerprint or eye scan or the like, which unlocks a door to gain access to a room. The door access control devices 120 further include a chirp generator configured to generate an audible chirp in response to valid door access.

In accordance with the embodiments, the audible chirp generator of each of the plurality of door access control devices 120 is dynamically reconfigured, by controller 110, during a post-incident response, to provide an indication of injured victim status within each room. The audible chirping is dynamically controlled, by controller 110, to indicate room priority based on in-room victim stats. The audible chirping, configured to represent in-room victim status, allows a mutual aid responder (not having a radio) to follow the prioritized chirping to rooms with highest priority followed by those room of medium or lesser priority. Mutual aid responders may have been previously trained as to the various audible chirpings that may be generated by the system.

As part of the building security management, the controller 110, which includes a processor and memory, is communicatively coupled to a plurality of in-room communication devices 130, depicted as in-room communication devices 132, 134, 136, and 138. The in-room communication devices 130 may include an in-room computer, tablet, laptop, cell phone or the like.

In accordance with some embodiments, each of the plurality of in-room communication devices 130 has been pre-programmed with a security application (security app) that allows for user input/entry pertaining to a mass incident event. The user input/entry may include sending an alert of a mass-incident event occurring in a building, sending notification that the mass incident event has ended, and sending victim status information. For example, the user input/entry may include sending an alert of an active shooter event, sending notification that the active shooter event has ended, and sending victim status information. Information pertaining to the incident is sent from the in-room communication devices 130 to the controller 110 for analytics, which determine a priority for each room based on victim status. The controller 110 generates chirp control signals 112, 114, 116, 118 for controlling customized chirping for playout at door access control devices 122, 124, 126, 128.

In accordance with some embodiments, the controller's processor is configured to send a prompt requesting in-room victim status information to each in-room communication device 130 and receive in-room victim status information in response to the prompt from each of the in-room communication devices 130.

The processor of controller 110 is configured to trigger a workflow, in response to the notification that the mass incident has ended and the received in-room victim status. The workflow provides an optimum route for a mutual aid responder 150 to follow. The workflow controls the chirp mechanism associated with each door access control device 122, 124, 126, 128 to generate customized audible chirps indicative of the in-room victim status.

For example, and as depicted in FIG. 1, the controller 110 may send a first chirp control signal 112 to enable and control the chirp mechanism at door access control device 122. The controller 110 may send a second chirp control signal 114 to enable and control the chirp mechanism at door access control device 124. The controller 110 may send a third chirp control signal 116 to enable and control the chirp mechanism at door access control device 126. The controller 110 may send a fourth chirp control signal 118 to enable and control the chirp mechanism at door access control device 128.

The controller 110 may configure the audible chirps to be generated at each room by comparing the in-room victim status from room to room as input into each respective in-room communication device 132, 134, 136, 138. Clusters of individuals are depicted in FIG. 1 to indicate different numbers of victims in each room, and the chirps may be generated based on the number of victims in each room. For example, seven people injured may be entered into in-room communication device 132, five people injured may be entered into in-room communication device 134, one person injured may be entered into in-room communication device 136, and three people injured may be entered into in-room communication device 138. The chirp control signals 112, 114, 116, 118 may be generated based on the number of victims in each room. Thresholds may be set for in-room victim status injury level and for number of in-room victims. The chirping generation may further be refined based on injury severity for those victims within each cluster as may further be entered into each respective in-room communication device 132, 134, 136, 138. For example, of the seven victims noted into in-room communication device 132, there may be further input/entry indicating the number of victims whom are conscious/unconscious, presence of gunshot wounds (for mass shooter incidents), victim mobility, and victim accessibility, to name a few. Thresholds may be set by the controller 110 based on the different types of injuries entered into each of the in-room communication devices. The controller 110 may dynamically adjust the thresholds based on the victim data for the current incident, such thresholds can further be used to establish priority amongst the rooms.

The audible chirps may be generated to identify a highest threshold of in-room victim injury status to a lowest threshold of in-room victim injury status. The customized audible chirps indicative of the in-room victim status may provide an optimal route for a mutual aid responder (who does not carry a communication device or have any direct communication with the system) to follow. In some embodiments, audible chirp may be characterized at least one of a volume level and frequency which may be based on victim injury thresholds. The victim injury thresholds may be based on victim injury severity of low, medium, severe and number of victims within a predetermined threshold range.

A few, non-limiting examples of victim status and chirping may include, but are not limited to:

Rooms with Injuries: Highest chirp volume possible, ~50% duty cycle (500 ms chirp, 500 ms off), Rooms with trapped victims: Highest volume possible, ~50% duty cycle (500 ms chirp, 500 ms off), Rooms with non-injuries: Highest volume possible, ~10% duty cycle (100 ms chirp, 900 ms off), Cleared Rooms: Stop Audio cues. Hence, in some embodiment, the workflow may trigger the generation of control signals that control audible chirping characterized by at least one of a volume level and frequency. Thresholds may be dynamically established on an incident-by-incident basis based on the totality of the received and analyzed victim status information. For example, loud chirping volume levels for rooms determined to be highest priority, and lower volume level for room with lower priority.

Figure 2:
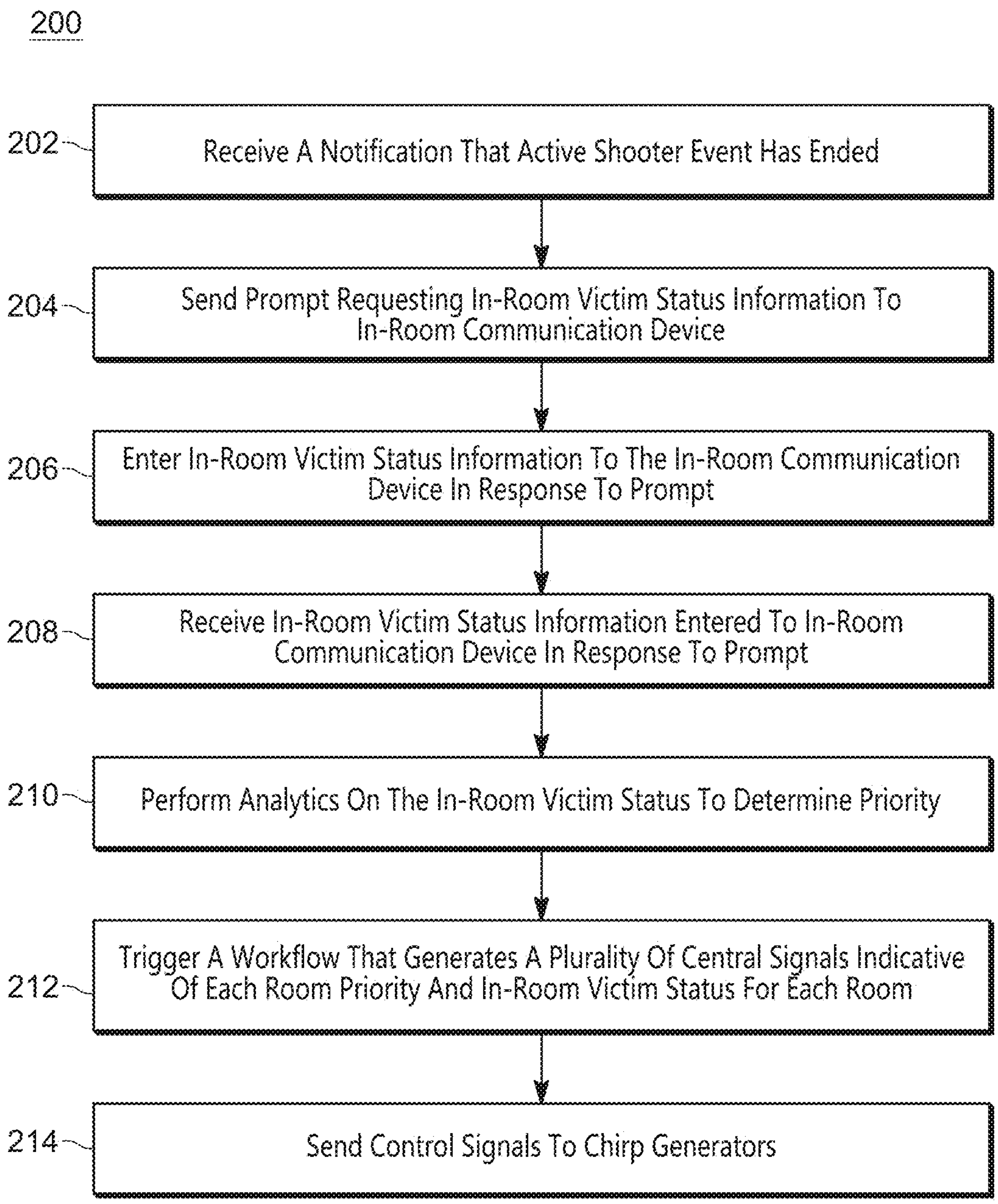
FIG. 2 is a flowchart of a method for generating the post-incident workflow including directional chirping in accordance with some embodiments.

FIG. 2 is a flowchart of a method 200 for managing a post-incident response in accordance with some embodiments. The method provides for generating a post-incident workflow including dynamically controlled chirping in accordance with some embodiments. The method begins at 202 by receiving, at a security system processor, a notification that a mass incident event, such as an active shooter event, has ended. For example, the notification may be received from one or more of the in-room communication devices of FIG. 1.

The method 200 continues to 204 with sending a prompt requesting in-room victim status information to the plurality of in-room communication device of the building. In-room victim status information is entered at 206_, in response to the prompt. For example, the in-room victim status may be entered by user(s) of the in-room communication devices of FIG. 1. Such users may include, but not be limited, to employees, students, staff, or anyone having access to the in-room communication device. The in-room communication device includes an application (app) which provides entry options for in-room victim status information, such as number of victims, type of injury, severity of injury, to name a few.

At 208, the in-room victim status information is received and analytics are performed thereon at 210, by the security system processor, to determine a priority for each room.

The method continues to 212 with triggering, by the security system processor, a workflow that generates a plurality of control signals indicative of each room priority and in-room victim status for each room.

The method continues to 214 with sending, by the security system processor, the control signals to chirp generators of door access control devices associated with each room of the building, each control signal controlling chirp playout indicative of the room priority and victim status.

The audible chirps may be generated to represent the criticality level associated with each room. The audible chirps may be characterized by volume level and/or frequency based on dynamically controlled victim injury level thresholds. Victim injury thresholds may be established, by the security system processor, based on number of victims in a room, injury type, and severity level, to characterize the room as low, medium, severe. The thresholds may be established on an incident-by-incent basis. The audible chirps may be generated to provide an optimal route for a mutual aid responder.

The audible chirps may cease in response to a room being cleared. The ceasing of the chirps may be entered by the mutual aid responder via a user input to the access control device.

Figure 3:
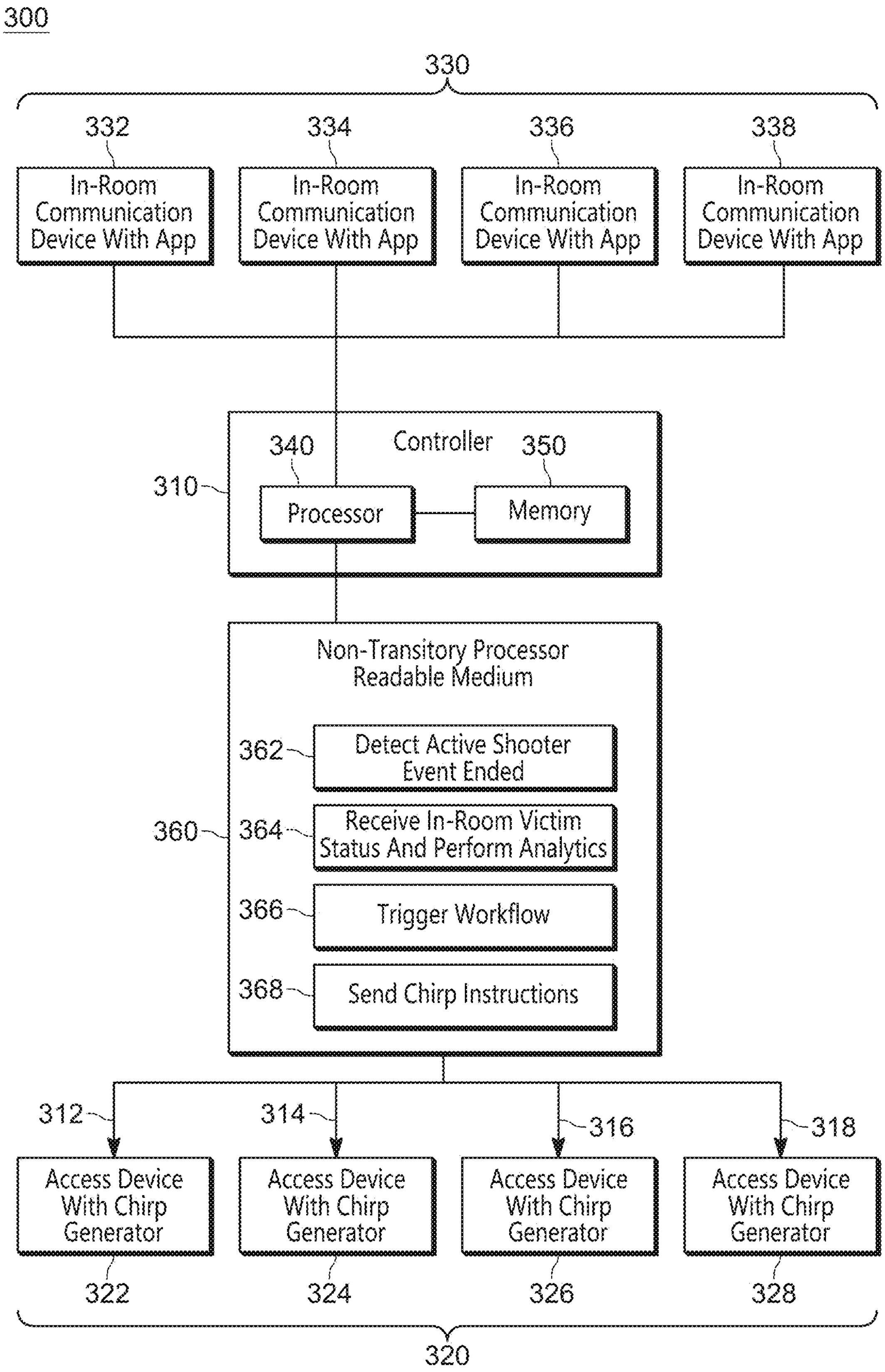
FIG. 3 is a block diagram of architectural elements for implementing the post-incident workflow with directional chirping in accordance with some embodiments.

FIG. 3 is an example of block diagram of architectural elements for a communication system 300 that may be used to implement the system and techniques of the embodiments. It should be understood that FIG. 3 represents one example implementation and that other implementations are also possible.

Communication system 300 may include a controller 310 for a security system, the controller including a processor 340, a memory 350, and a non-transitory processor readable medium 360. In-room communication devices 330 may be dispersed within the rooms of the building, as previously described in FIG. 1 and FIG. 2, and as represented for example by in-room communication devices 332, 334, 336, 338 in FIG. 3. Door access control devices 320 with chirp generators are associated with each room of the building, as previously described in FIG. 1 and FIG. 2, and as represented for example by access control devices 322, 324, 326, 328.

Processor 340 may be coupled to memory 350. Memory 350 may store a set of instructions that when executed by processor 340 cause the processor to implement the techniques described herein. Processor 340 may cause memory 350 to load a set of processor executable instructions from non-transitory processor readable medium 360. Non-transitory processor readable medium 360 may contain a set of instructions thereon that when executed by processor 340 cause the processor to implement the various techniques described herein.

For example, the instructions of medium 360 may cause the processor to detect a post-incident notification that a mass incident event, such as an active shooter event or other event, has ended 362 as described generally throughout the specification. The instructions of medium 360 may cause the processor to receive in-room victim status information and perform analytics thereon to determine priority 364. The instructions of medium 360 may cause the processor to trigger a workflow 366 that generates a plurality of control signals indicative of each room priority and in-room victim status for each room. The instructions of medium 360 may cause the processor to send the control signals as chirp instructions 368 to chirp generators of door access control devices 320 associated with each room of the building. each control signal 312, 314, 316, 318 sent to access devices 322, 324, 326, 328 controls chirp playout indicative of the room priority and victim status.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes may be referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot trigger a workflow that generates electronic control signals which automatically interface with door access control devices, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . aa", "has . . . aa", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the “C” programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “one of”, without a more limiting modifier such as “only one of”, and when applied herein to two or more subsequently defined options such as “one of A and B” should be construed to mean an existence of any one of the options in the list alone (e.g., A alone or B alone) or any combination of two or more of the options in the list (e.g., A and B together).

A device or structure that is “configured” in a certain way is configured in at least that way, but may also be configured in ways that are not listed.

The terms “coupled”, “coupling” or “connected” as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method to manage a post-incident response in a building, comprising:

receiving, at a security system processor, a notification that a mass incident event has ended;

sending a prompt, from the security system processor, requesting in-room victim status information to a plurality of in-room communication device of the building;

receiving, at the security system processor, the in-room victim status information;

performing, by the security system processor, analytics on the in-room victim status information to determine room priority;

triggering, by the security system processor, a workflow that generates a plurality of control signals indicative of each room priority and in-room victim status for each room; and sending, from the security system processor, the control signals to chirp generators of door access control devices associated with each room of the building, each control signal controlling chirp playout indicative of the room priority and victim status.

2. The method of claim 1, wherein the in-room victim status is compared from room to room, and the chirp playout is generated to identify highest priority in-room victim injury status to lowest priority in-room victim injury status.

3. The method of claim 1, wherein the chirp playout is characterized by at least one of a volume level and frequency.

4. The method of claim 3, wherein the volume level and frequency are determined based on thresholds set for:

in-room victim status injury level; and number of in-room victims.

5. The method of claim 1, wherein the chirp playout is generated to provide an optimal route for a mutual aid responder who does not carry a radio.

6. The method of claim 1, wherein the chirp playout associated with a room ceases to playout in response to an input to a door access control device associated with the room, the input being indicative of the room being cleared.

7. A communication system for managing a post-incident response of a building, comprising:

a security system controller having a processor configured to:

receive a notification that a mass incident event has ended;

send a prompt requesting in-room victim status information to a plurality of in-room communication device of the building;

receive the in-room victim status information;

perform analytics on the in-room victim status information to determine room priority;

trigger a workflow that generates a plurality of control signals indicative of each room priority and in-room victim status for each room; and send the plurality of control signals to chirp generators of door access control devices associated with each room of the building, each control signal controlling chirp playout indicative of the room priority and in-room victim status.

8. The communication system of claim 7, wherein each classroom has an audible chirp associated with its respective in-room victim status, and the chirps designate a criticality level associated therewith.

9. The communication system of claim 7, wherein the chirp playout is characterized by at least one of a volume level and frequency, which are based on victim injury thresholds.

10. The communication system of claim 9, wherein the victim injury thresholds are based on victim injury severity of low, medium, severe and number of victims within a predetermined threshold range.

11. The communication system of claim 7, wherein the analytics include comparing in-room victim status information from room to room to determine a customized audible chirp for playout at each room.

12. The communication system of claim 7, further comprising determining the chirp playout for an optimal route for a mutual aid responder, wherein the mutual aid responder has no direct communication with the communication system.

13. The communication system of claim 11, wherein the audible chirps associated with a room cease with the room being cleared.

14. A non-transitory processor readable medium containing a set of instructions that when executed by a processor cause the processor to:

detect a post-incident notification within a building that a mass incident event had ended;

send a prompt to retrieve in-room victim status information from in-room devices in the building;

perform analytics on the in-room victim status information to determine room priority;

trigger a workflow that generates a plurality of control signals indicative of each room priority and in-room victim status for each room; and send the control signals to chirp generators of door access control devices associated with each room of the building, each control signal controlling chirp playout indicative of the room priority and victim status.

15. The non-transitory medium of claim 14, wherein the analytics performed by the processor cause the processor to:

compare in-room victim status information from room to room and generate control signals for the chirp playout to identify a highest in-room victim injury status to a lowest in-room victim injury status.

16. The non-transitory medium of claim 14, further comprising instructions that cause the processor to:

control the chirp playout by at least one of a volume level and frequency.

17. The non-transitory medium of claim 14, further comprising instructions that cause the processor to control a volume level and frequency based on thresholds determined for:

in-room victim status injury level; and number of in-room victims.

18. A door access control device for a building, comprising:

a reader device responsive to predetermined inputs for door access to a room;

an audible chirp generator configured to generate an audible chirp in response to valid door access; and the audible chirp generator being reconfigured to generate customized chirp signals indicative of in-room victim status in response to a post-incident control signal.

19. The door access control device of claim 18, wherein:

the building is a school and the room is a classroom; and the building is an office building and the room is an office.

20. The door access control device of claim 18, wherein the customized chirp signals are generated to provide an optimal route for a mutual aid responder without a radio.

* * * * *